US005890150A

United States Patent [19]

Ushijima et al.

[11] Patent Number: 5,890,150
[45] Date of Patent: Mar. 30, 1999

[54] RANDOM SAMPLING METHOD FOR USE IN A DATABASE PROCESSING SYSTEM AND A DATABASE PROCESSING SYSTEM BASED THEREON

[75] Inventors: Kazutomo Ushijima, Kokubunji; Shinji Fujiwara, Sagamihara; Kazuo Masai; Yori Takahashi, both of Yokohama; Itaru Nishizawa, Hachioji, all of Japan

[73] Assignee: Hitachi, Ltd., Tokyo, Japan

[21] Appl. No.: 12,207

[22] Filed: Jan. 23, 1998

[30] Foreign Application Priority Data

Jan. 24, 1997 [JP] Japan .................................... 9-025863

[51] Int. Cl.$^{6}$ ...................................................... G06F 17/30
[52] U.S. Cl. ........................................ 707/3; 707/4; 707/5
[58] Field of Search .................................... 707/3, 4, 5, 1, 707/2

[56] References Cited

U.S. PATENT DOCUMENTS

| | | | |
|---|---|---|---|
| 5,379,422 | 1/1995 | Antoshenkov | 707/1 |
| 5,664,171 | 9/1997 | Agrawal et al. | 707/2 |
| 5,675,786 | 10/1997 | McKee et al. | 707/103 |

OTHER PUBLICATIONS

"ACM SIGMOD International Conference on Management of Data (SIGMOD'96)," ACM Press, pp. 205–216, 1996.

"International Conference on Very Large Databases(VLDB'86)," Morgan Kaufmann Publishers, pp. 160–169, 1986.

"Dictionary of Statistics," Hiraku Takeuchi, Toyo Keizai Shinpousha Pub. pp. 243–247, 252–254, 1989.

"Principles of Database and Knowledge–Base Systems," J.D. Ullman, Computer Science Press, pp. 358–360, 1988.

*Primary Examiner*—Paul V. Kulik
*Attorney, Agent, or Firm*—Antonelli, Terry, Stout & Kraus, LLP

[57] ABSTRACT

A query issue processing method, a query conversion processing method, and a data control processing method are provided for enhancing the efficiency of random sampling processing for use in a database processing system. In query issue processing 2, a query including random sampling processing is issued. In query conversion processing 8, application sequences of random sampling processing and another query processing are exchanged by considering a sampling unit of the random sampling processing. Further, in record control processing 4, random access to a secondary storage device is reduced, thereby enhancing random sampling processing efficiency. Unlike the conventional query conversion processing not considering the sampling unit, the issuance of the query including random sampling processing and performing query conversion by considering the sampling unit allow random sampling to be applied also to a query including aggregation processing, thereby enhancing the efficiency of queries in a wider range. Reduction in the random access to the secondary storage device further enhances that efficiency.

16 Claims, 15 Drawing Sheets

BEFORE CHANGE

SAMPLING PROCESSING

SAMPLING COLUMN : NOT SPECIFIED
SAMPLE GROUPING COLUMN : {CUSTOMER CATEGORY, PRIORITY, TRANSPORTATION}

GROUPING AND AGGREGATION PROCESSING - 1

AGGREGATION COLUMN : {UNIT PRICE}
GROUPING COLUMN : {ORDER NO., CUSTOMER CATEGORY, PRIORITY, TRANSPORTATION}

AFTER CHANGE

GROUPING AND AGGREGATION PROCESSING - 1

AGGREGATION COLUMN : {UNIT PRICE}
GROUPING COLUMN : {ORDER NO., CUSTOMER CATEGORY, PRIORITY, TRANSPORTATION}

SAMPLING PROCESSING

SAMPLING COLUMN : {ORDER NO., CUSTOMER CATEGORY, PRIORITY, TRANSPORTATION}
SAMPLE GROUPING COLUMN : {CUSTOMER CATEGORY, PRIORITY, TRANSPORTATION}

FIG.2

20 TABLE

21 COLUMN

22 RECORD

| ORDER NUMBER | AREA | QUANTITY | SUM |
|---|---|---|---|
| 01 | TOKYO | 10 | 2000 |
| 02 | TOKYO | 20 | 1000 |
| 03 | TOKYO | 30 | 3000 |
| 04 | OSAKA | 10 | 5000 |
| 05 | TOKYO | 40 | 3000 |
| 06 | NAGOYA | 20 | 2000 |
| 07 | TOKYO | 10 | 4000 |
| 08 | OSAKA | 30 | 1000 |
| 09 | NAGOYA | 20 | 4000 |
| 10 | TOKYO | 40 | 300 |

FIG. 3

CUSTOMER TABLE 31

| CUSTOMER NO. | CUSTOMER CATEGORY | NAME | ADDRESS |
|---|---|---|---|
| CUSTOMER 1 | CONSTRUC-TION | AOYAMA | TOKYO |
| CUSTOMER 2 | FOODS | INOUE | OSAKA |
| CUSTOMER 3 | CONSTRUC-TION | UEDA | NAGOYA |

ORDER TABLE 32

| ORDER NO. | CUSTOMER NO. | PRIORITY | DATE OF ORDER |
|---|---|---|---|
| ORDER 1 | CUSTOMER 1 | HIGH | 5/14 |
| ORDER 2 | CUSTOMER 2 | LOW | 5/16 |
| ORDER 3 | CUSTOMER 3 | HIGH | 5/19 |
| ORDER 4 | CUSTOMER 1 | LOW | 5/20 |

PRODUCT TABLE 33

| ORDER NO. | PRODUCT NAME | TRANS-PORTATION | UNIT PRICE |
|---|---|---|---|
| ORDER 1 | CEMENT | FREIGHTER | 3500 |
| ORDER 1 | SHEET IRON | TRUCK | 6000 |
| ORDER 1 | TIMBER | TRUCK | 2000 |
| ORDER 2 | WHEAT | SHIP | 500 |
| ORDER 2 | BEEF | SHIP | 800 |
| ORDER 3 | CEMENT | FREIGHTER | 7500 |
| ORDER 4 | TIMBER | SHIP | 2000 |

FIG. 12

| ORDER NO. | CUSTOMER CATEGORY | PRIORITY | TRANS-PORTATION | UNIT PRICE |
| --- | --- | --- | --- | --- |
| ORDER 1 | CONSTRUC-TION | HIGH | FREIGHTER | 3500 |
| ORDER 1 | CONSTRUC-TION | HIGH | TRUCK | 6000 |
| ORDER 1 | CONSTRUC-TION | HIGH | TRUCK | 2000 |
| ORDER 2 | FOODS | LOW | SHIP | 500 |
| ORDER 2 | FOODS | LOW | SHIP | 800 |
| ORDER 3 | CONSTRUC-TION | HIGH | FREIGHTER | 7500 |
| ORDER 4 | CONSTRUC-TION | LOW | SHIP | 2000 |

FIG. 13

| ORDER NO. | CUSTOMER CATEGORY | PRIORITY | TRANS-PORTATION | ORDER AMOUNT |
| --- | --- | --- | --- | --- |
| ORDER 1 | CONSTRUC-TION | HIGH | FREIGHTER | 3500 |
| ORDER 1 | CONSTRUC-TION | HIGH | TRUCK | 8000 |
| ORDER 2 | FOODS | LOW | SHIP | 1300 |
| ORDER 3 | CONSTRUC-TION | HIGH | FREIGHTER | 7500 |
| ORDER 4 | CONSTRUC-TION | LOW | SHIP | 2000 |

FIG. 14

| CUSTOMER CATEGORY | PRIORITY | TRANS-PORTATION | AVERAGE OR-DER AMOUNT |
|---|---|---|---|
| CONSTRUC-TION | HIGH | FREIGHTER | 5500 |
| CONSTRUC-TION | HIGH | TRUCK | 8000 |
| FOODS | LOW | SHIP | 1300 |
| CONSTRUC-TION | LOW | SHIP | 2000 |

FIG. 15

| ORDER NO. | CUSTOMER CATEGORY | PRIORITY | TRANS-PORTATION | ORDER AMOUNT |
|---|---|---|---|---|
| ORDER 1 | CONSTRUC-TION | HIGH | FREIGHTER | 3500 |
| ORDER 1 | CONSTRUC-TION | HIGH | TRUCK | 8000 |
| ORDER 2 | FOODS | LOW | SHIP | 1300 |
| ORDER 3 | CONSTRUC-TION | HIGH | FREIGHTER | 7500 |
| ORDER 4 | CONSTRUC-TION | LOW | SHIP | 2000 |

FIG. 16

| ORDER NO. | CUSTOMER CATEGORY | PRIORITY | TRANS-PORTATION | UNIT PRICE |
|---|---|---|---|---|
| ORDER 1 | CONSTRUC-TION | HIGH | FREIGHTER | 3500 |
| ORDER 1 | CONSTRUC-TION | HIGH | TRUCK | 6000 |
| ORDER 1 | CONSTRUC-TION | HIGH | TRUCK | 2000 |
| ORDER 2 | FOODS | LOW | SHIP | 500 |
| ORDER 2 | FOODS | LOW | SHIP | 800 |
| ORDER 3 | CONSTRUC-TION | HIGH | FREIGHTER | 7500 |
| ORDER 4 | CONSTRUC-TION | LOW | SHIP | 2000 |

RANDOM SAMPLING METHOD FOR USE IN A DATABASE PROCESSING SYSTEM AND A DATABASE PROCESSING SYSTEM BASED THEREON

BACKGROUND OF THE INVENTION

1. Field of the Invention

The present invention generally relates to a query processing method for use in a relational database and, more particularly, to a data random sampling processing method for efficient execution of queries including random sampling processing for a large-scale database.

2. Description of Related Art

Recently, as corporate in-house information processing systems become widespread, various business data such as dealing information and customer information have come to be stored in databases. As a result, the range of information made available through these databases is quickly expanding.

At the same time, demand for data mining is increasing that is intended for extending business chance and enhancing business efficiency by analyzing large-scale data stored in database to extract features and regularities of the data.

Generally, data mining requires to issue queries with different data item combinations and condition settings and repeat data analysis to extract features and regularities of large-scale data.

However, as the size of data to be stored in database increases, the time for processing one piece of query increases, making it more difficult to efficiently extract data features and regularities. For a technology for enhancing the response of query processing, a data cube approach is known as disclosed in "ACM SIGMOD International Conference on Management of Data (SIGMOD '96)," ACM Press, pp. 205–216.

In the data cube approach, some part of estimated queies are processed before they are actually accepted. If an already processed query is issued to the data base, the query is not actually processed but only returning the result. In this approach, however, has drawbacks such as requiring to have a large storage area for preparing query results and a long query processing time for queries for which no query results have been prepared because a range of queries that can be handled by performing necessary processing beforehand is restricted.

On the other hand, feature quantity calculation and regularity extraction of large-scale data require only the trend and feature of large-scale data, not an exact query result in many cases. Therefore, in order to significantly shorten query processing time, a method is used in which random sampling is introduced in query processing and feature quantity and regularity are estimated from the randomly sampled data to reduce the data quantity to be processed and shorten response time.

It is important for the execution of a query including random sampling not only to simply reduce data processing quantity by random sampling but also to convert a query to an equivalent query of higher execution efficiency immediately before execution without changing query processing result, thereby significantly shortening the execution time. In other words, random sampling is applied as early as possible in query processing to reduce the quantity of data to be subsequently processed, thereby reducing the processing quantity of the entire query.

Generally, a logical structure of data to be processed for query has a form of a table 20 shown in FIG. 2. The table 20 has records 21 in lateral direction and columns 22 in vertical direction. The same columns of these records have data of the same form. A set of records obtained after database processing performed on a table that is a set of records becomes a table again.

The database processing performed on a table includes condition evaluation processing, projection processing, join processing, and grouping and aggregation processing.

The following describes the above-mentioned four types of processing.

The condition evaluation processing in a database processing system denotes that one or more condition evaluation columns and conditions set to the values of these columns are designated. Of the records included in a table to be processed, records are extracted which satisfy a condition designated for a designated column and the table is reconstituted by these extracted records.

The projection processing in a database processing system denotes that one of more projection columns are designated, only the designated columns are extracted for the records included in a table, and the table is reconstituted by these extracted records.

The join processing in a database processing system denotes that or more columns commonly included in two tables to be processed are designated, all records included in one table are joined with all records having the same value in the join column of the records included in the other table, and the table is reconstituted by records newly generated by the join operation.

The grouping and aggregation processing in a database processing system denotes that one or more grouping columns and one or more columns to be aggregated are designated, the records included in a table to be processed which have the same value of the designated one or more grouping columns are classified as one group, statistical quantity such as amount or average of the values of a column to be aggregated is calculated for each group, and the result of this calculation is outputted as one record.

The present invention introduces random sampling defined as follows into a database. The following describes a query converting method including the random sampling.

The random sampling in a database processing system denotes that, from a table which is a set of records, records are randomly sampled and the table is reconstituted by the sampled records. In the random sampling, a set of records taken out by one sampling operation is referred to as a sampling unit. It is assured that, in one sampling processing, the sampling probabilities of the sampling units are equal to each other.

Thus, a query issued for a database is constituted by applying the above-mentioned various types of processing in an appropriate sequence to a table to be queried. Therefore, in optimization of query including random sampling, it is important to shorten processing time by deformed a query in a range that does not lose random sampling characteristic and apply random sampling as early as possible in query processing to reduce the data quantity to be handled in subsequent processing.

For a conventional method of converting query including random sampling, the query optimizing method is known as disclosed in "International Conference On very Large Databases (VLDB' 86)," Morgan Kaufmann Publishers, pp. 160–169. The disclosed method changes the processing application sequence while retaining the random sampling characteristic of random sampling in queries including random sampling and such basic database processing such as condition evaluation processing, projection processing, and join processing.

However, the conventional method involves a problem that query conversion processing cannot be applied to the case in which grouping and aggregation processing is included in a query for optimizing random sampling. Therefore, for the query optimizing method in data mining application, the conventional method provides only a limited availability.

A first problem involved in optimizing random sampling in the query conversion method including grouping and aggregation processing is that the sampling unit of random sampling is not handled properly. For example, if customer purchase patterns are to be checked by classifying product sale detail information by customer, attempting to analyze the purchase pattern of each customer after performing random sampling simply on product sale detail information level does not provide the complete product purchase history of each customer, failing to obtain efficient purchase pattern analysis. This is because, although random sampling for purchase pattern analysis for each customer should be performed considering the purchase history of each customer as a sampling unit of the sampling process, the actual sampling is performed ignoring this sampling unit.

A second problem is that, if random sampling is applied to the records stored in such a storage device as a magnetic disk in record read processing, random access to the storage device occurs because the storage locations of the records to be sampled become random, thereby increasing the random sampling time.

A third problem is that the conventional method has no feature for designating query processing time, query result precision and so on in query issue processing, so that the user cannot easily issue a query which reads part of data by random sampling to realize use-defined query result estimation.

SUMMARY OF THE INVENTION

It is therefore a first object of the present invention to overcome the above-mentioned first problem and provide a query converting method associated with random sampling applicable also to queries including grouping and aggregation processing by performing query optimization as query conversion processing in which a sampling unit is considered in converting queries including random sampling into queries that can be executed efficiently.

A second object of the present invention is to provide an efficient record storing and reading method that not cause random access to a storage device in randomly sampling records from the storage device.

A third object of the present invention is to provide a query issuing method that allows the user to designate query processing execution time or query result precision.

In order to achieve the above-mentioned first through third objects, the present invention has the following three means.

(1) The present invention provides query conversion processing in which concept of a random sampling column is introduced for queries including random sampling and conversion of the queries which consider the sampling unit of the random sampling processing is performed to convert the queries including grouping and aggregation processing into queries having higher execution efficiency.

The sampling column herein denotes one or more columns to be designated for a table to be sampled to designate the sampling unit in random sampling. In the random sampling using random sampling columns, a value is randomly assigned to each of the random sampling columns in one random sampling operation and records having the values assigned to the columns are all sampled from the table, providing a random sampling result.

In the present invention, queries are converted such that a collection of records of which random sampling columns have the same values is handled as one sampling unit. This allows the user to get a complete customer purchase history by designating, in the above-mentioned example, customer numbers as random sampling columns to perform sampling by with the records having the same customer numbers being as the sampling unit.

However, in what follows, in random sampling with no random sampling column SC designated, random sampling on a record basis is performed regardless of record column values and, in random sampling in which random sampling columns SC are an empty set (NULL), all records are sampled.

In the random sampling according to the present invention, a sample grouping column SGC may be designated in addition to random sampling columns. If an SGC is designated, the records in the table are grouped according to the value of the designated SGC. The records having the same values in each of the resultant groups are sampled as one sampling unit. In the random sampling with sample grouping columns designed, it is assured that the sampling probability of the sampling unit is equal throughout the groups.

(2) The present invention provides record storage processing and record read processing for reducing, in record storage and read access to a record storage device for storing records to be randomly sampled, the number of times random access is made to the record storage device by applying a hash function to record random sampling columns and performing record storage and reading based on the hash value.

(3) The present invention provides query result evaluation processing for implementing query processing having a given response time and a given precision by designating a query processing required time and a precision of the estimated value of query result to adjust the record quantity to be randomly sampled according to database scale and query complexity.

The other variations of the present invention and the constitutions for implementing these variations will be described in the detailed description of preferred embodiments herein.

BRIEF DESCRIPTION OF THE DRAWINGS

These and other objects of the invention will be seen by reference to the description, taken in connection with the accompanying drawing, in which:

FIG. 2 is a diagram associated with a constitution of a table;

FIG. 3 is a diagram illustrating an example of a database;

FIG. 12 is a diagram illustrating an example of join processing in the query example;

FIG. 13 is a diagram illustrating a result of aggregation processing 1 in the query example;

FIG. 14 is a diagram illustrating a result of aggregation processing 2 in the query example;

FIG. 15 is a diagram illustrating records to be sampled by query conversion of random sampling and classification and aggregation processing 1;

FIG. 16 is a diagram illustrating records to be sampled by conversion of random sampling columns of random sampling.

DETAILED DESCRIPTION OF PREFERRED EMBODIMENTS

This invention will be described in further detail by way of example with reference to the accompanying drawings.

Figure 1:
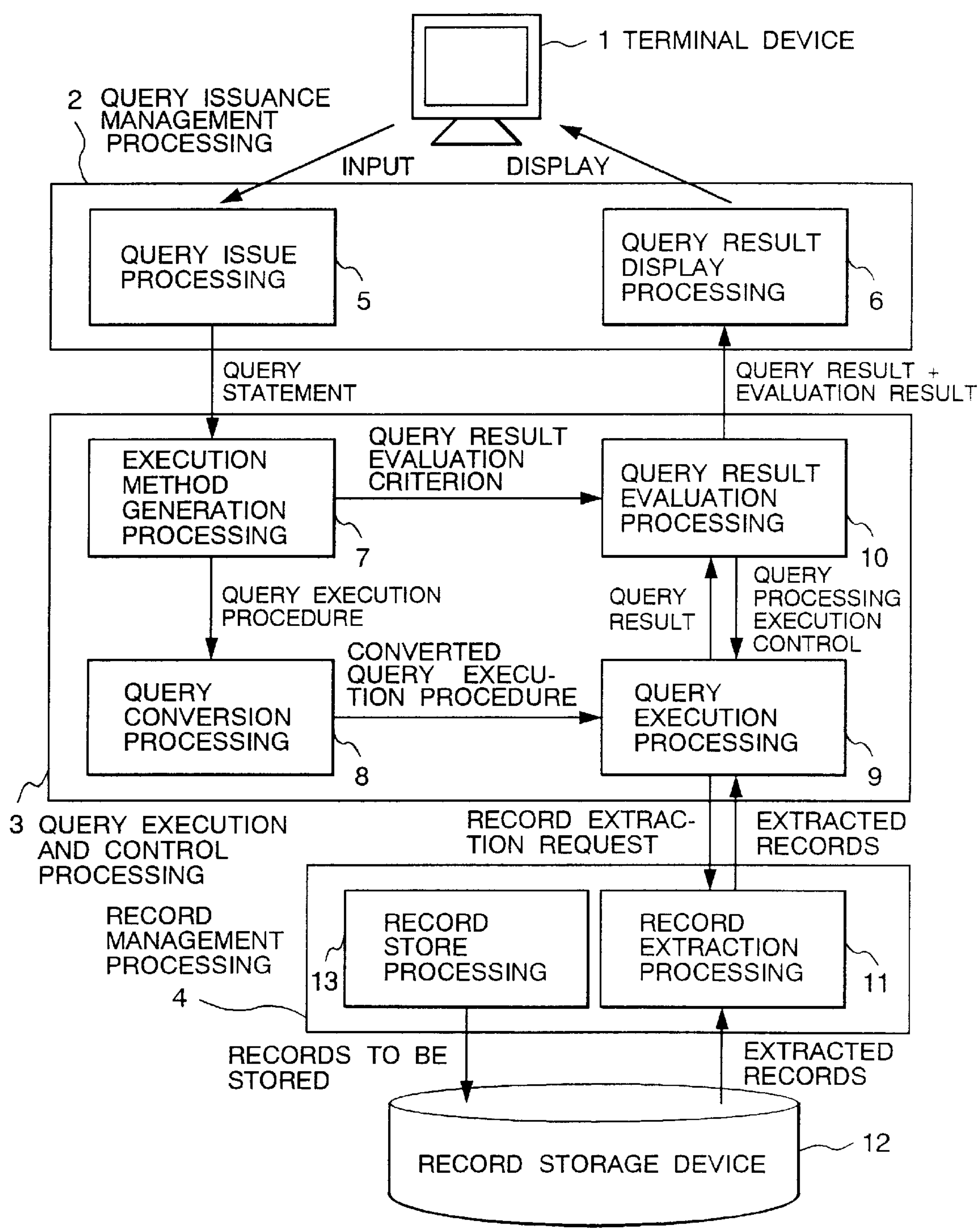
FIG. 1 is a schematic diagram illustrating a database processing system according to the present invention.

Now, referring to FIG. 1, there is shown a database processing system practiced as one preferred embodiment of the present invention.

The following describes a constitution of the above-mentioned preferred embodiment with reference to FIG. 1.

A random sampling method according to the present invention comprises query issue processing 2 having query issue processing 5 for generating a query statement according to the input from a terminal device 1 and query processing result display processing 6 for displaying a query processing result and an evaluation result onto the terminal device, query execution management processing 3 having execution procedure generation processing 7 for generating an executable intermediate code and a query evaluation criterion from the above-mentioned query statement, query conversion processing 8 for converting the intermediate code into another intermediate code having higher execution efficiency, query processing execution processing 9 for performing query processing according to the intermediate code, and query processing result evaluation processing 10, and record management processing 4 having record extraction processing 11 for extracting a record as data and record storage processing 13 for storing the read record into a record storage device 12. Programming the series of these processing operations and storing the resultant programs in a recording medium allows use of the present invention at any given place.

First, the query issue processing 5 generates a query statement according to the input from the terminal device 1. Next, the execution procedure generation processing 7 references the query statement generated by the query issue processing 5 to generate a query execution procedure and a query result evaluation criterion.

Further, the query conversion processing 8 converts the query execution processing generated by the execution procedure generation processing 7 into a query execution procedure having higher execution efficiency.

Then, the query execution processing 9 issues a record extraction request to the record extraction processing 11 according to the query execution procedure converted by the query conversion processing 8 to generate a query result by manipulating a record extracted by the record extraction processing 11.

The query execution processing 9 continues execution of the query processing until instructed from the query result evaluation processing 10.

The record extraction processing 11, according to the record extraction request issued from the query execution processing 9, extracts the record from the record storage area 12 stored by the record storage processing 13 and passes the extracted record to the query execution processing 9.

The query result evaluation processing 10 evaluates the query processing result generated by the query execution processing 9 according to the query result evaluation criterion generated by the execution procedure generation processing 7, sends the query processing result and the evaluation result to the result display processing 6, determines whether to discontinue the query execution processing or not, and, if the query execution processing is to be discontinued, instructs the query execution processing 9 to discontinue the query processing.

Lastly, the query result display processing 6 receives the query processing result and its evaluation result generated by the query processing result evaluation processing 10 and displays the received results onto the terminal device 1.

The following describes details of the above-mentioned query issue processing, query procedure generation processing, query conversion processing, record read processing, and query processing result evaluation processing by use of a specific query example.

First, for the specific example, a database composed of three tables shown in FIG. 3 will be described below. A customer table 31 consists of four columns of customer number, customer category, name, and address.

The customer number provides the key column of this customer table, has a unique value for each record of the table, and the values of this column uniquely determine the records in the table.

An order table 32 consists of four columns of order number, customer number, priority, and order date. The order number provides the key column of this table, has a unique value for each record of the table, and the values of this column uniquely determine the records in the table. The customer number provides the external key for the key column customer number of the customer table 31. The range of the values of the customer number column in the customer table 31 matches the range of the values of customer number column in the order table 32.

A product table 33 consists of four columns of order number, product name, transportation, and unit price.

The order number provides the external key for the key column order number of the order table 32. The range of the values of the order number column in the order table 32 matches the range of the values of the order number column in the product table 33.

In what follows, the customer number column in the customer table 31 is expressed in customer table.customer number for example.

The query processing 5 in the present preferred embodiment denotes the processing for passing a query statement written in a database query language such as SQL to the execution procedure generation processing 7.

For example, a specific example of the query statement written in SQL for the above-mentioned database is as follows:

1: SELECT CUSTOMER CATEGORY, PRIORITY, TRANSPORTATION, AVG(RANDOM(ORDER AMOUNT))
2: FROM SELECT ORDER NUMBER, CUSTOMER CATEGORY, PRIORITY, TRANSPORTATION, SUM (PRODUCT TABLE, UNIT PRICE) AS ORDER AMOUNT
3: FROM CUSTOMER TABLE, ORDER TABLE, PRODUCT TABLE
4: WHERE CUSTOMER TABLE.CUSTOMER NUMBER=ORDER TABLE. CUSTOMER NUMBER
5: AND ORDER TABLE.ORDER NUMBER=PRODUCT TABLE.ORDER NUMBER
6: GROUP BY ORDER TABLE.ORDER NUMBER, CUSTOMER TABLE. TRANSPORTATION
7: GROUP BY CUSTOMER CATEGORY, PRIORITY, TRANSPORTATION

In the above-mentioned query statement, the numeral at the head of each line denotes the line number for description and therefore does not constitute a part of the query statement.

The key word RANDOM on the first line specifies that the average of the order amount is calculated based on the estimation by random sampling. If the keyword RANDOM is specified immediately before keyword SELECT, it specifies use of random sampling for record sampling.

The above-mentioned query statement example indicates that the records having the same values of the customer table.customer number and the order table.customer number and the same values of the order table.order number and the product table.order number are joined together from the customer table, the order table, and the product table (lines 3 through 5), the records are grouped according to the values of the four columns of the order table.order number, the customer table.customer category, the order table.priority, and the product table.transportation (line 6), a total of the product table.unit prices is obtained for each group (line 2), the resultant records are grouped according to three columns of customer category, priority, and transportation (line 7), and lastly the average of the order amounts is estimated for each group by use of random sampling (line 1).

FIG. 12 shows a result of extracting associated columns from each of the customer table, the order table, and the product table shown in FIG. 3 and the records having the same values of the customer table.customer number and the order table.customer number and the same values of the order table.order number and the product table.order number are jointed together. In this processing, the join column of the first join processing is {CUSTOMER NO.} and the join column of the second join processing is {ORDER NO.}.

FIG. 13 shows a result of grouping the records according to the values of four columns of order table. order number, customer table.customer category, order table.priority, and product table.transportation based on the result shown in FIG. 12 and totaling the product table. unit prices for each group. In this processing, the grouped column is {ORDER NO, CUSTOMER CATEGORY, PRIORITY, TRANSPORTATION} and the column to be aggregated is {UNIT PRICE}.

FIG. 14 shows a result of grouping the records according to the values of three columns of customer category, priority, and transportation (line 7) and averaging the order amounts of each group. In this processing, the grouped columns are {CUSTOMER CATEGORY, PRIORITY, TRANSPORTATION} and the column to be aggregated is {ORDER AMOUNT}.

The execution procedure generation processing 7 in the present preferred embodiment converts the query statement issued from the query issue processing 5 into an intermediate code that can be interpreted and executed in the query execution processing 9.

Generally, in what kind of intermediate code a query statement is to be converted is dependent on the database processing system used. In the present preferred embodiment, the database processing is converted into the following intermediate codes for example.

Namely, condition evaluation processing of which condition evaluation column for table T is CC is expressed in C(CC,T), projection processing of which projection column for table T is PC is expressed in P(PC,T), join processing of which join column for table T is JC is expressed in J(JC,S, T), aggregation processing of which aggregation column for table T is AG and grouped column for table T is GC is expressed in A(AG,GC,T), and random sampling processing of which sampling column for table T is SC and sample grouped column is SGC is expressed in S(SC, SGC,T).

Consequently, conversion of the above-mentioned query example into the intermediate code results as follows:

A(order amount,{customer category, priority, transportation},
S(no specification,{customer category, priority, transportation},
A(product table.unit price,{order number, customer category, priority, transportation},
J({order number}, product table, J({customer number}, customer table.order table))))

In this query, the random sampling processing is installed for estimating a result of the classification and aggregation processing, so that the random sampling column SC of the random sampling processing is not specified and the sampled grouped columns SGC are the grouped columns {customer category, priority, transportation} of the classification and aggregation processing to be estimated.

To randomly sample a query result, the random sampling column SC of the random sampling processing is not specified and the sample grouped column SGC is { } (empty set).

Figure 4:
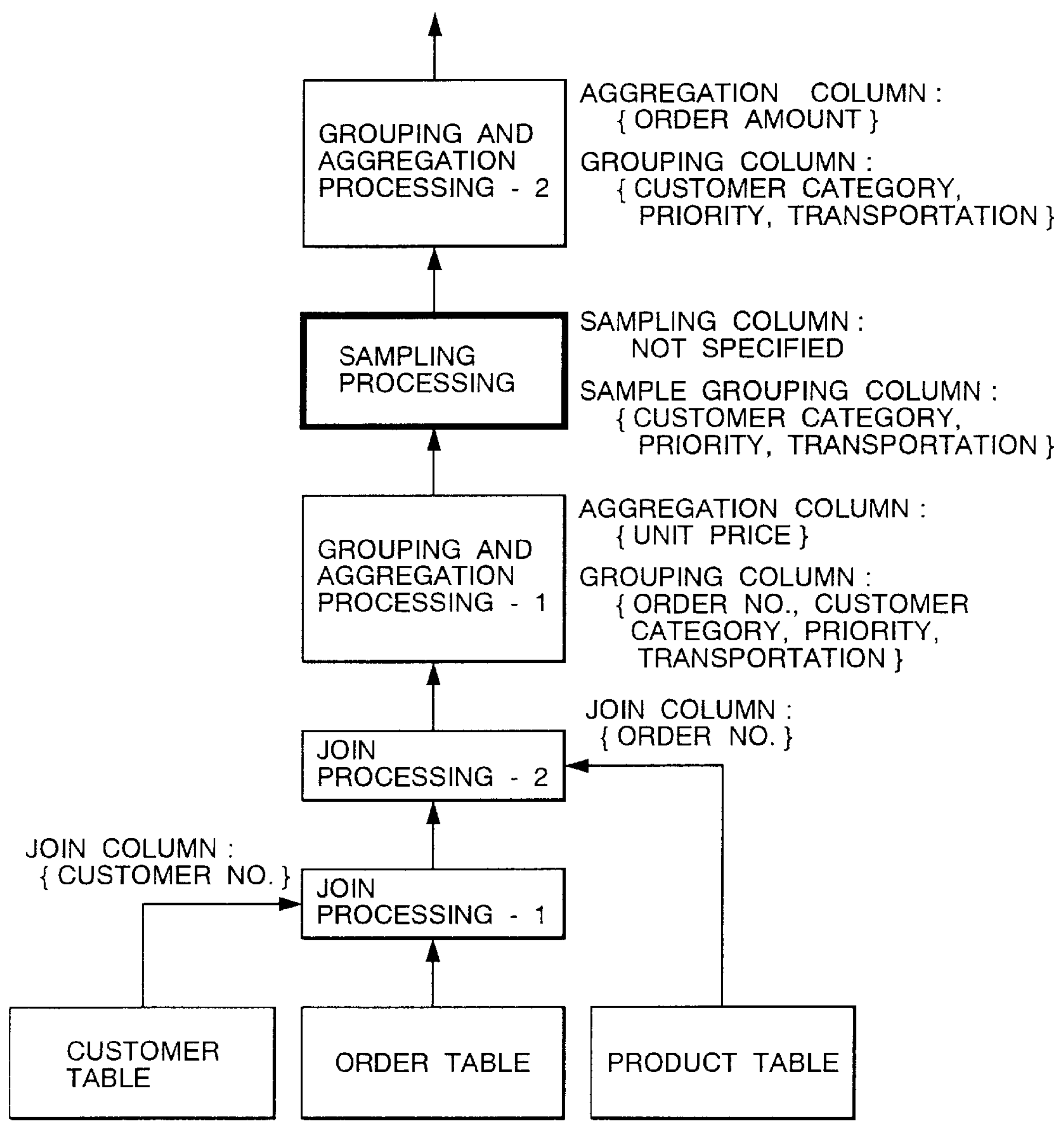
FIG. 4 is a diagram illustrating an intermediate code before conversion of a query example.

At this moment, a result of converting the above-mentioned query example into the intermediate code is illustrated as a tree structure as shown in FIG. 4.

In execution of the query processing, the processing is applied sequentially to the records to be processed, from the processing designated as a leaf of the intermediate code toward the processing designated as the root.

In the execution procedure generation processing 7 in the present preferred embodiment, a query processing result evaluation criterion is generated from the query statement issued by the query issue processing 5 and the generated evaluation criterion is passed to the query result evaluation processing 10.

For example, if a query processing time is specified at issuance of a query, the specified processing time is passed to the query result evaluation processing; if an aggregation result precision is specified for a query including aggregation processing, the specified precision is passed to the query result evaluation processing.

One example of specifying the processing time at issuance of a query or the precision of aggregation result is by adding a keyword for the time specification or precision specification to the query statement. For example, the following query statement specifies estimation of the product unit price sum for each customer category in a range in which the sum can be obtained within two minutes:

SELECT customer category, SUM(RANDOM(unit price)) AS order amount
FROM customer table, order table, product table
WHERE customer table.customer number=order table.customer number
AND order table.order number=product table.order number WITHIN 2 MINUTES;

The following query statement specifies estimation of a product unit price sum for each customer category with a precision of 99%:

SELECT customer category, SUM(RANDOM(unit price)) AS order amount
FROM customer table, order table, product table
WHERE customer table.customer number=order table.customer number
AND order table.order number product table.order number WITH 0.99 PRECISION;

If, in the above-mentioned two query statements, only the keyword for time specification or precision specification is specified, the inserting position of the random sampling processing can be automatically determined to supplement the RANDOM keyword, thereby reducing the load of query statement issuance from the terminal device.

In the query conversion processing 8 in the present preferred embodiment, exchange is made in application sequence between the random sampling processing installed in the above-mentioned intermediate code generated by the above-mentioned execution procedure generation processing 7 and the query processing to be applied immediately before, thereby converting the above-mentioned intermediate code into an intermediate code of higher execution efficiency. At this moment, in the above-mentioned query conversion processing, the query including the random sampling processing is deformed such that the sampling unit is retained by use of random sampling column, thereby converting the query into a query having higher execution efficiency while maintaining randomness of the random sampling processing.

First, the state in which query conversion has been applied to the intermediate code of the above-mentioned query example is shown below.

Figure 5:
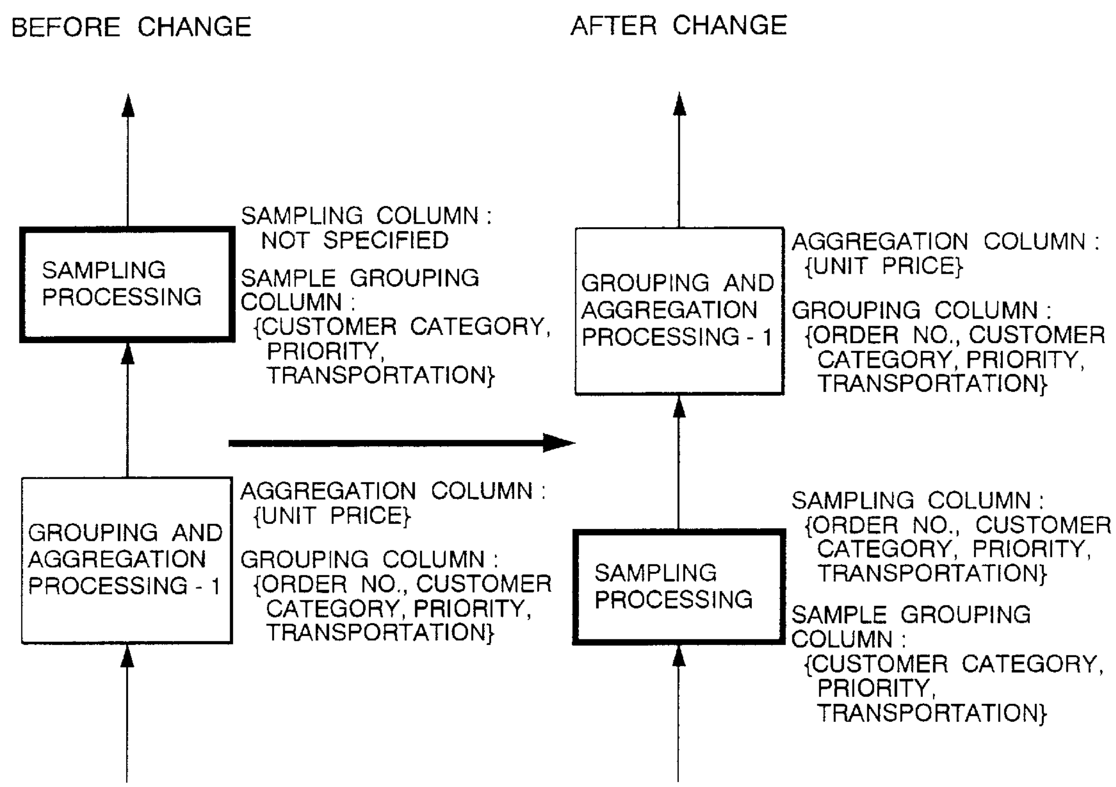
FIG. 5 is a diagram illustrating application sequence exchange between random sampling and classification and aggregation processing 1 in the query example.

As shown in FIG. 5, the value of the random sampling column of the random sampling processing inserted in the intermediate code is changed to the value of the grouped columns {order number, customer category, priority, transportation} of the immediately preceding classification and aggregation processing 1, thereby changing the application sequence of the random sampling processing and the classification and aggregation processing.

This change randomly assigns values from the table before application of the classification and aggregation processing 1 to the random sampling columns as shown in FIG. 15, thereby sampling all records that satisfy {order number: order 1, customer category: construction, priority: high, transportation: truck} for example.

At this moment, because the grouped columns are unique columns in the table after application of the classification and aggregation processing 1, the values of the grouped columns correspond to individual records one to one. Therefore, randomly sampling the table after application of the classification and aggregation processing on a record basis is equivalent to the random sampling by specifying the values of the grouped columns before application of the classification and aggregation processing.

Therefore, the randomness of the random sampling processing is not lost by the above-mentioned exchange in application sequence between the processing operations.

Figure 6:
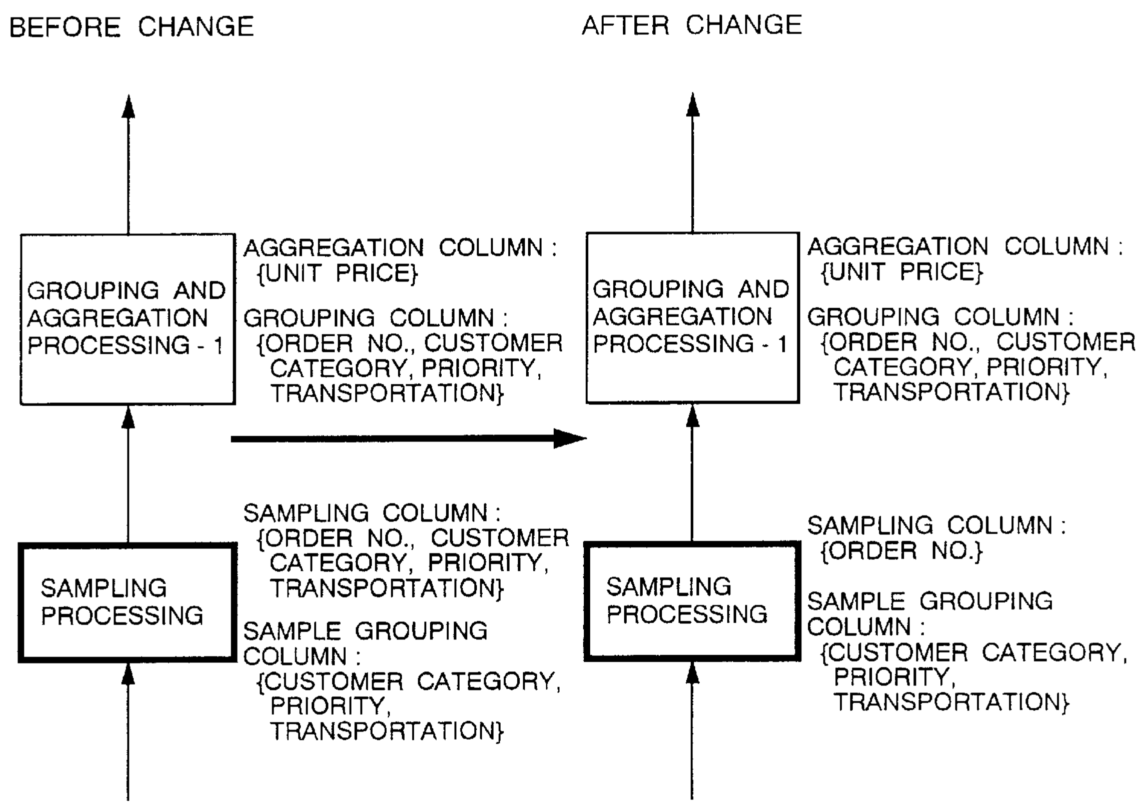
FIG. 6 is a diagram illustrating the conversion of random sampling columns in random sampling in the query example.

Next, as shown in FIG. 6, the random sampling processing is applied by changing the random sampling column of the random sampling processing to the difference obtained by subtracting the sample grouped column from the random sampling column before the change, namely {order number}.

This change randomly assigns the value from the classification and aggregation processing 1 to the random sampling column as shown in FIG. 16, thereby sampling all records having {order number: order 1} for example.

If the table before random sampling is grouped at this moment according to the sample grouped columns {customer category, priority, transportation}, the value of the sample grouped column is equal to each other in each group, so that, if the random sampling columns {order number, customer category, priority, and transportation} are assigned with their respective values to record sampling, only the column {order number} is valid for record specification. Therefore, the randomness of the random sampling processing is not lost by the above-mentioned exchange in application sequence between the processing operations.

Figure 7:
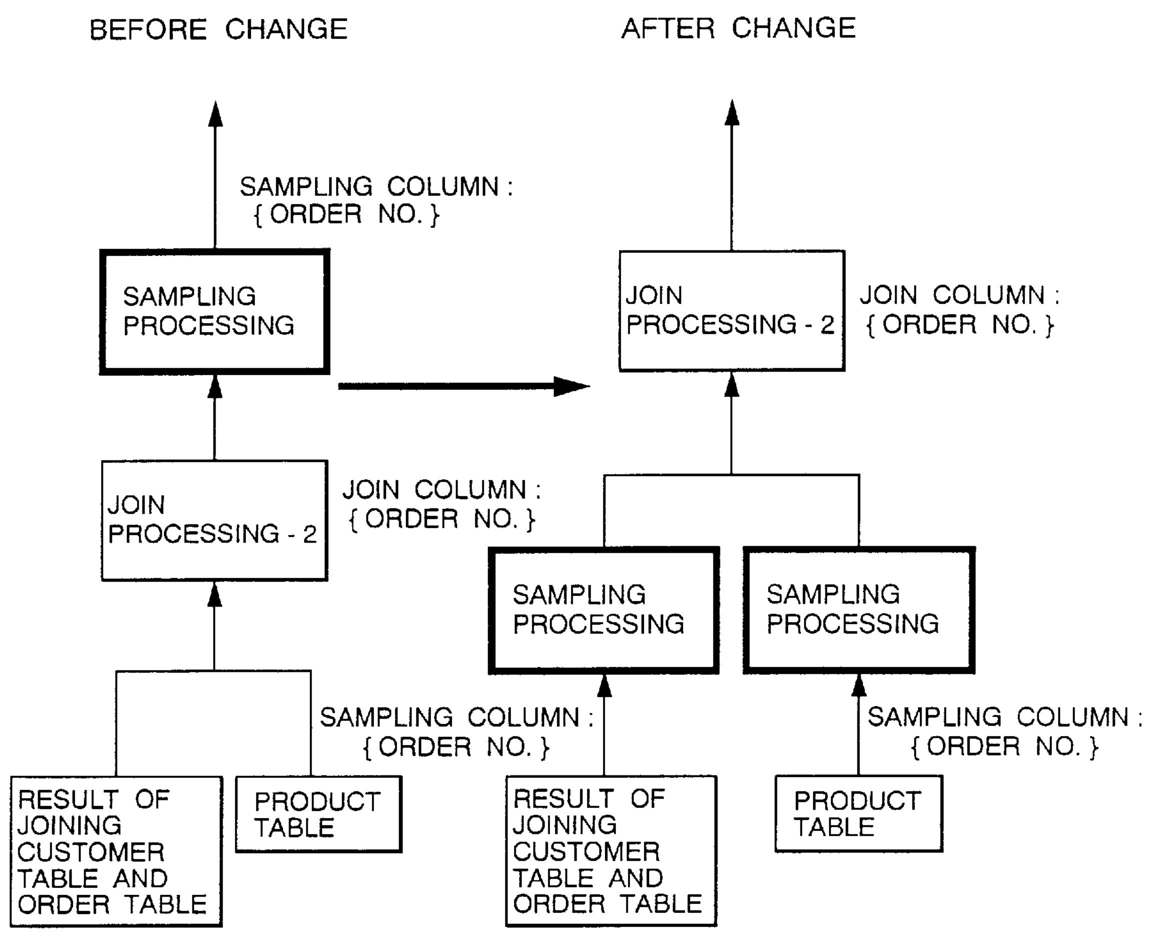
FIG. 7 is a diagram illustrating application sequence exchange between random sampling and join processing 2 in the query example.

Further, in order to change the application sequence between the following join processing 2 and the random sampling processing, the random processing operation is distributed to the tables before join as shown in FIG. 7.

This change samples all records having the value {order number: order 1} assigned to the random sampling column from the table after application of the aggregation processing.

At this moment, a set of records obtained by sampling the records having the value specified in the random sampling column from the table after application of the join processing corresponds to a set of records obtained by sampling the records having the value specified in the random sampling column from the table after application of the join processing one to one, so that the randomness of the random sampling processing is not lost by the exchange in application sequence between the processing operations.

Figure 8:
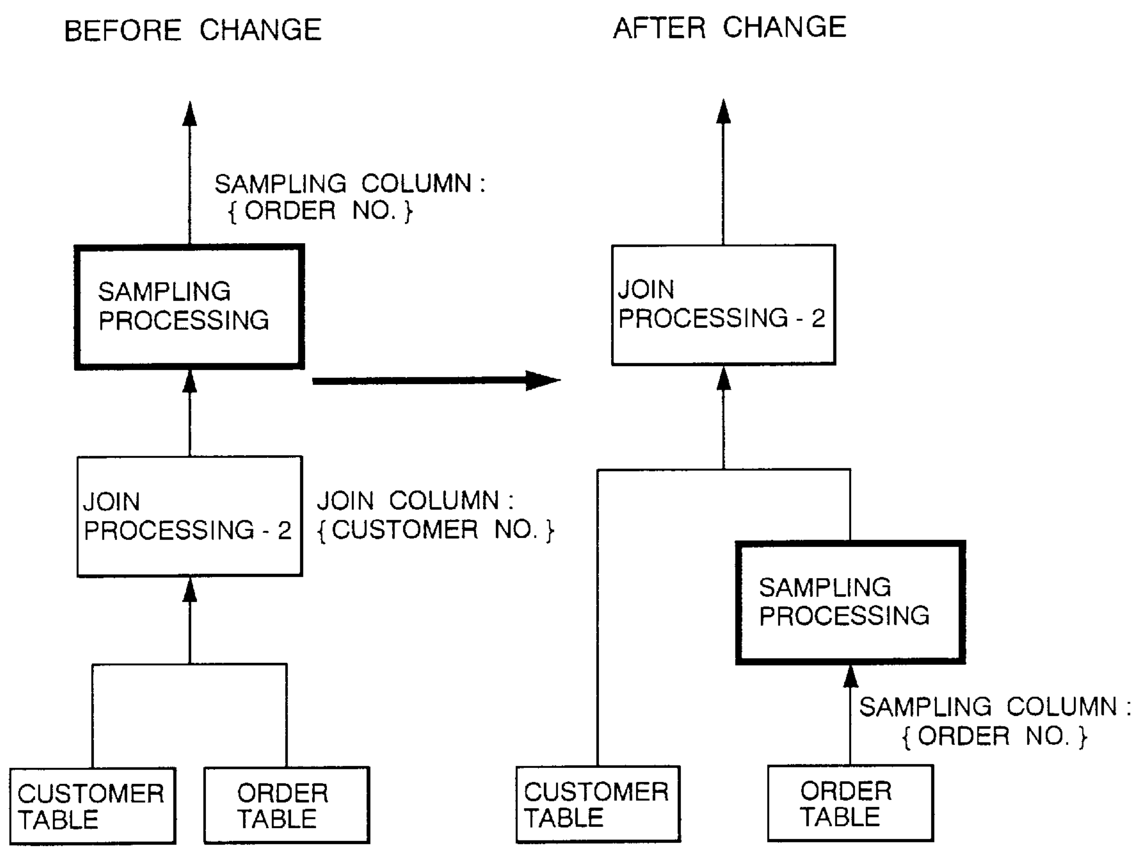
FIG. 8 is a diagram illustrating application sequence exchange between random sampling and join processing 1 in the query example.
Figure 9:
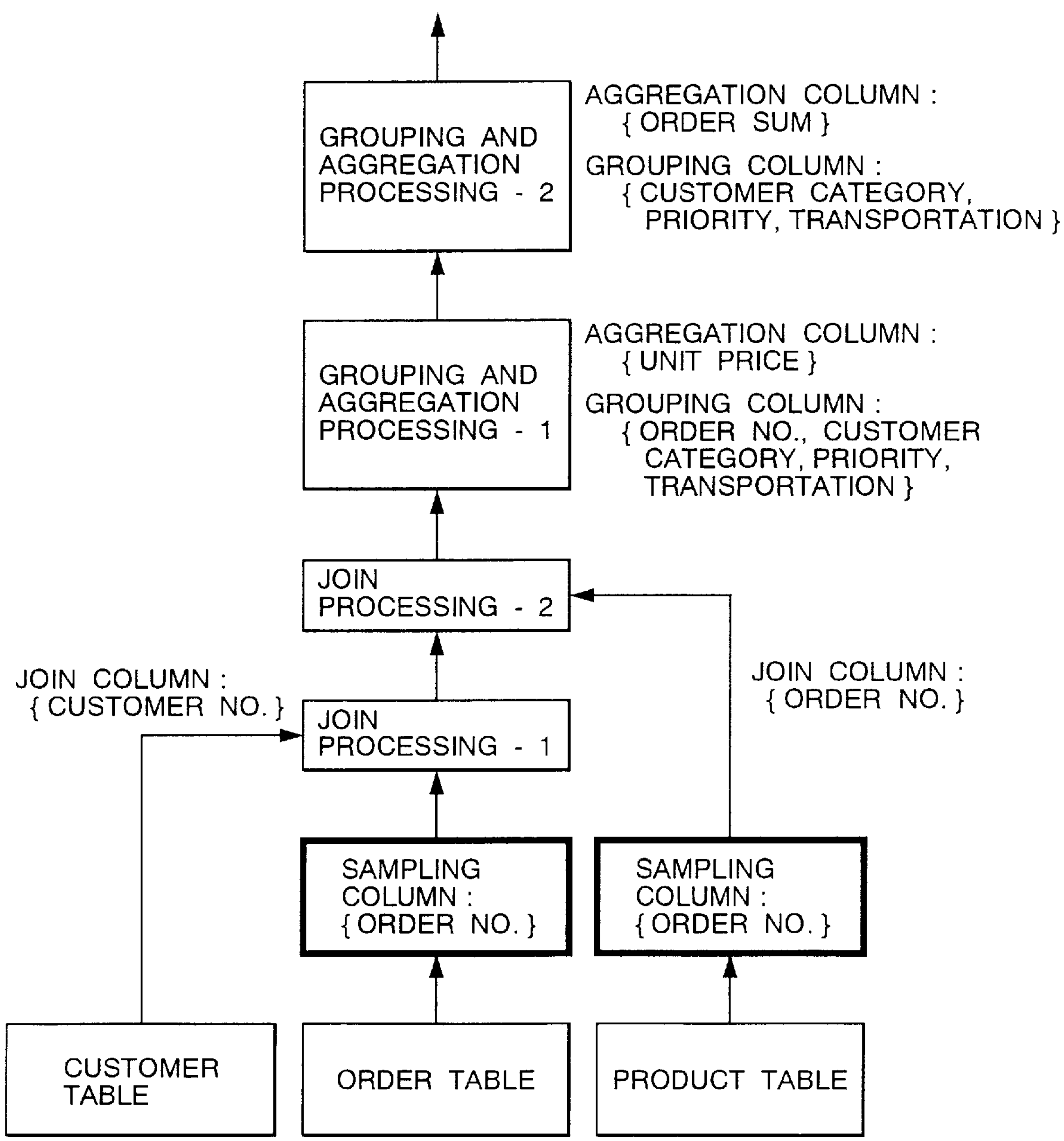
FIG. 9 is a diagram illustrating an intermediate code after conversion of the query example.

Also in the subsequent join processing 1, the random sampling processing is distributed to the tables before application of the join processing as shown in FIG. 8 to exchange the application sequence between the processing operations.

This change samples all records having the value {order number: order 1} assigned to the random sampling column. Exchange of this application sequence can also be performed by the same reason as mentioned above.

However, since the customer table does not include {order number} as a column, the random sampling column of the random sampling processing to be distributed to the customer table is NULL and therefore all records are sampled for the customer table.

The above-mentioned query conversion converts the intermediate code of the above-mentioned query example as follows.

In what follows, a method of exchanging processing sequence between various query processing operations and the random sampling processing will be described.

The exchange between the random sampling processing and the condition evaluation processing may be performed simply by exchanging the application sequences of both processing operations:

namely, S(SC,SGC,C(CC,T))≡C(CC,S(SC,SGC,T)) is established, where ≡ denotes that the operations of both sides are equivalent as the random sampling processing.

For the operations of both sides to be equivalent as the random sampling processing, two points may be indicated that (i) the sampling units match in the processing of both sides and (ii) the sampling probability of each sampling unit is retained in the processing of both sides or (i) the sampling units match in the processing or both sides and (ii) in the query after conversion, the sampling units of the random sampling processing operations are independent of each other and sampled with an equal sampling probability. Therefore, that the above-mentioned processing operations of both sides are equivalent is understood from the following two points:

(i) the records to be sampled in one sampling processing operation are the records included in table T which satisfy SC=sc, SGC=sgc and the condition specified in the condition evaluation column CC, where sgc is the value of the sample grouped column SGC of sample groups into which the records are classified and sc is the value specified in the random sampling column Sc, and the sampling units of both sides are equal to each other; and (ii) in the queries before and after conversion, a combination of the values of SC and SGC and the sampling units before and after query conversion correspond to each other one to one and, if the value of SC is randomly determined for SGC, the sampling probability of each sampling unit is retained in the query conversion.

If SC is not specified, random sampling is performed on a record basis. The records before and after the processing correspond one to one by the condition evaluation processing. The sampling units are equal to each other before and after the conversion and the sampling probability is retained before and after the query conversion for the records, of the records included in table T, that satisfy the condition.

If SC=NULL, then the random sampling processing is whole sampling, so that the operations of both sides match each other. Exchange between the random sampling processing and the projection processing may be performed simply by exchanging the application sequences of both processing operations:

namely, S(SC,SGC,P(PC,T))≡P(PC,S(SC,SGC,T)) is established. However, for the random sampling processing of the left side to be implemented, $SC \subseteq PC$ is required.

At this moment, that the processing operations of both sides are equivalent to each other is understood from the following two points:

(i) the records to be sampled by one sampling processing operation are the records included in table T which satisfy SC=sc and SGC=sgc, where sgc is the value of the sample grouped column SGC of sample groups into which the records are classified and sc is the value specified in the random sampling column SC, and the sampling units of both sides are equal to each other; and (ii) a combination of the values of SC and SGC and the sampling unit correspond to each other one to one and, if the value of SC is randomly determined for SGC, the sampling probability of each sampling unit is retained in the query conversion.

If SC is not specified, the records before and after the processing correspond one to one by the projection processing. The sampling units before and after conversion are equal to each other and the sampling probability for each record is also retained.

If SC=NULL, then the random sampling processing is whole sampling, so that the operations of both sides match each other. Exchange between the random sampling processing and the classification and aggregation processing may be performed simply by exchanging the application sequences of both processing operations:

namely, S(SC,SGC,A(AC,GC,T))≡A(AC,GC,S(SC,SGC,T)) is established.

At this moment, that the processing operations of both sides are equivalent to each other is understood from the following two points:

(i) the records to be sampled by one sampling processing operation are the records included in table T which satisfy SC=sc and SGC=sgc, where sgc is the value of the sample grouped column SGC of sample groups into which the records are classified, sc is the value specified in the random sampling column SC, and gc is the value of the grouped column GC of the group obtained by the classification and aggregation processing, and the sampling units of both sides are equal to each other; and (ii) a combination of the values of SC and SGC and the sampling unit correspond to each other one to one and, if the value of SC is randomly determined for SGC, the sampling probability of each sampling unit is retained in the query conversion.

If SC is not specified, the grouped column of the classification and aggregation processing is specified for SC to perform query conversion. If no grouping processing is performed, the result of the classification and aggregation processing is one record, so that whole sampling is performed without performing the random sampling processing.

If SC=NULL, then the random sampling processing is whole sampling, so that the operations of both sides match each other. Exchange between the random sampling processing and the join processing may be performed by exchanging the application sequencies of both processing operations with limiting the random sampling columns to commonly included columns in respective tables.

namely, S(SC,SGC,J(JC,S,T)≡J(JC,S(SC/S,SGC/S,S),S(SC/T,SGC/T,T)) is established.

At this moment, that the processing operations of both sides are equivalent to each other is understood from the following two points:

(i) the records to be sampled in one sampling processing operation are the records that satisfy SC/S=sc/S and SGC/S=sgc/S in table S and SC/T=sc/T and SGC/T=sgc/T in table T and are equal in JC, which are sampled on the left-side processing. The records that are not sampled on the right-side processing do not satisfy any of the above-mentioned conditions, so that such records are not sampled on the left-side processing either. Therefore, the sampling units of both sides are equal to each other; and (ii) a combination of the values of SC and SGC and the sampling unit correspond to each other one to one and, if the value of SC is randomly determined for SGC, the sampling probability of each sampling unit is retained in the query conversion.

If SC is not specified, S(not specified, SGC,J(JC, S,T)≡S(KC,SGC,J(JC,S,T) where KC is the key column of J(JC,S,T).

If the key column does not exist in J(JC,S,T), the distribution is performed with a weight according to the attribute value of the join processing added. Namely, random sampling is performed with the occurrence ratio of attribute value xi of attribute X in table T being |T.xi| and the sampling probability of records having attribute xi from table S being |T.xi|/|T.x|max.

The sampling unit remains unchanged in the conversion that S(not specified, SGC,J(JC,S,T))≡S(not specified, SGC, J(JC,Select(|T.xi|/|T.x|max, S(not specified, S)),T)). The sampling operations of the sampling units are independent of each other and their sampling probabilities are equal to each other as follows:

1/|S|*|T.xi|/|T.x|max*1/|T.xi|=1/|S||T.x|max.

If SC=NULL, then the random sampling processing is whole sampling, so that the operations of both sides match each other.

If, for the random sampling processing, the sample grouped column SGC is included in the random sampling column SC (SC SGC), the random sampling column may be replaced by the difference obtained by subtracting the sample grouped column from the random sampling column.

Figure 17:
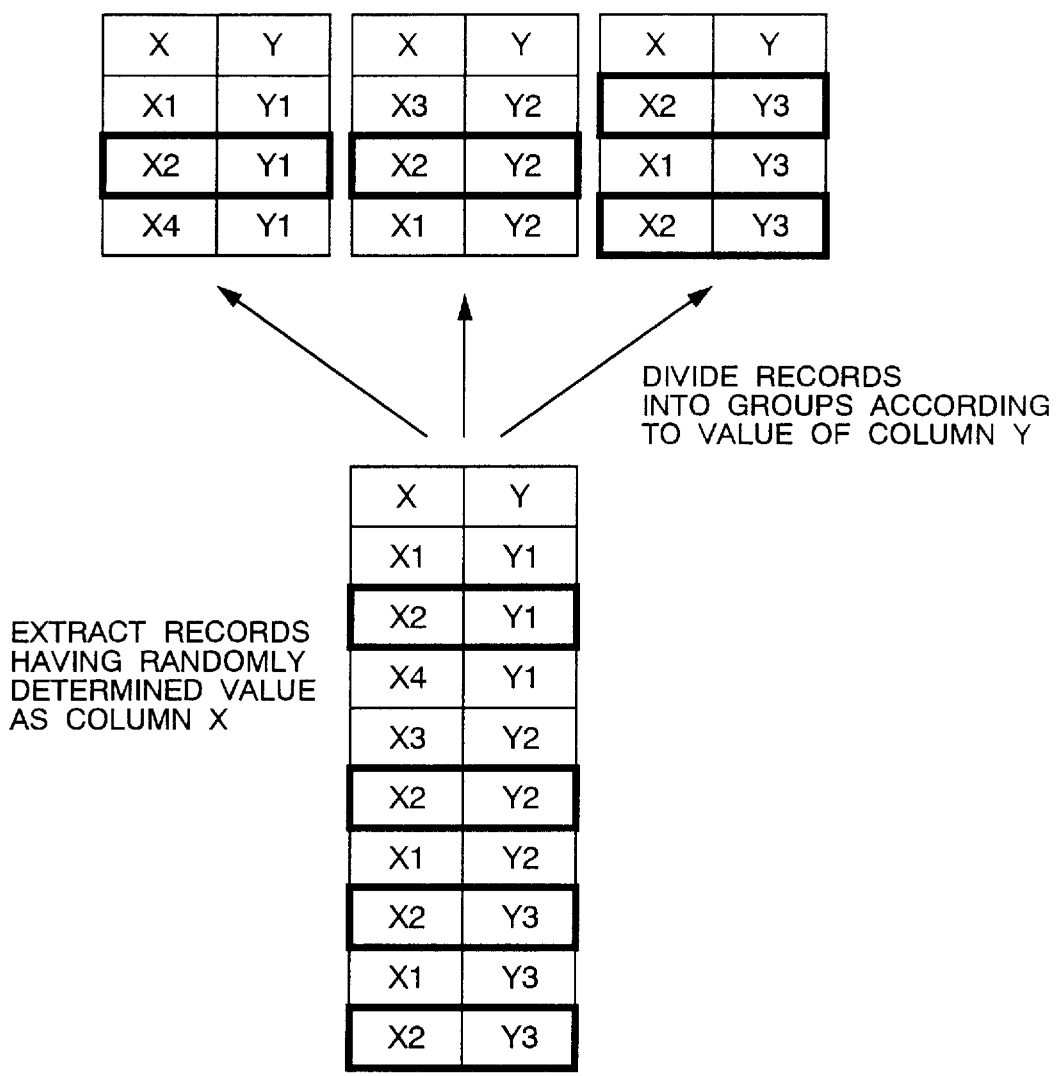
FIG. 17 is a diagram illustrating a method of converting random sampling columns of random sampling.

For example, if SC={X,Y}, SGC={Y} as shown in FIG. 17, the sampling unit in this random sampling processing is the record in which the values of columns X and Y are equal to each other. When the records of the table are classified relative to the value of column Y and then random sampling is performed with respect to the values of column X and column Y and when the records of the table are first randomly sampled with respect to the value column X obtained by subtracting the random sampling column SGC from the random sampling column SC and then the sample records are grouped with respect to the value of column Y, the sampling units and the sampling probabilities are equal throughout the groups. Namely, S(SC,SGC,T)≡S(SC–SGC, SGC,T) is established.

At this moment, that the processing operations of both sides are equivalent to each other is understood from the following two points:

(i) in the processing on the left side, let one of the records to be sampled in one sampling processing operation be r, the value of the random sampling column SC of r be sc, and the sample grouped column SGC be sgc, then SCG=sgc and SC–SGC=sc–sgc are established, so that, by assigning the same values of SC and SGC, the record r is also sampled in the processing on the right side.

Conversely, in the processing on the left side, let one of the records to be sampled in one sampling processing operation be r, the value of the random sampling column SC–SGC of r be sc–sgc, and the sample grouped column SGC be sgc, then SGC=sgc and SC=sc are established, so that, by assigning the same values of SC and SGC, the record r is also sampled in the processing on the left side.

Thus, the same record is sampled for the assignment of the same values of SC and SGC, so that the sampling units are equal to each other; and (ii) if a combination of the values of SC and SGC and the sampling unit correspond to each other one to one and, if the value of SC is randomly determined for SGC, the sampling probability of each sampling unit is retained in the query conversion.

The record read processing 11 in the present preferred embodiment reads records from the record storage device 12 according to a record read request issued by the above-mentioned query execution processing 9.

Figure 11:
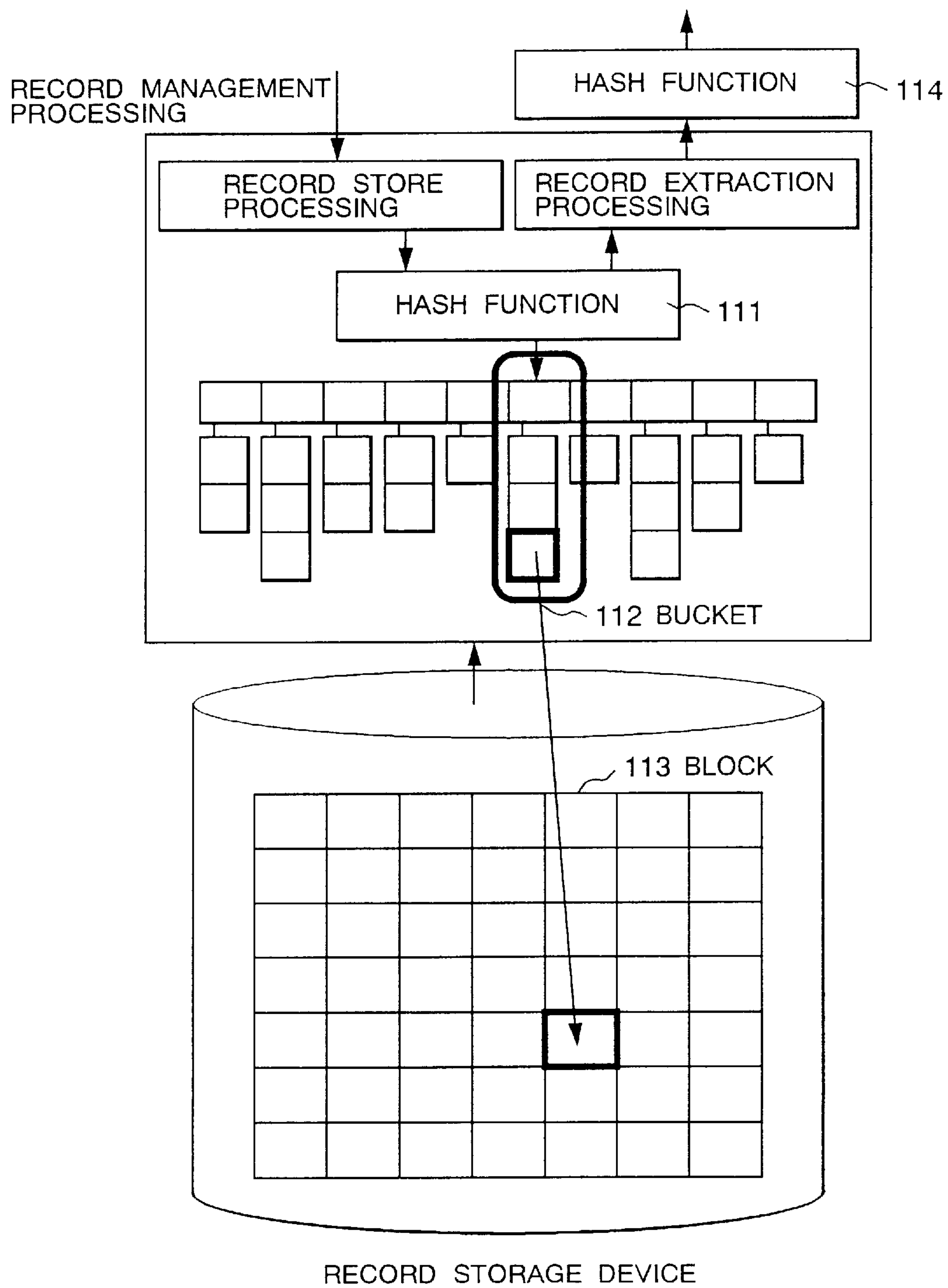
FIG. 11 is a diagram illustrating record storage processing for storing records into the record storage device.

FIG. 11 illustrates the state in which record storage is performed in the present preferred embodiment. In storing records in the record storage device 12 in the present preferred embodiment, columns of one or more records are designated beforehand as broken columns BC, to which a hash function 111 is applied and, according to its value, the records are divided into groups called buckets 112 to be stored.

For the hash function 111 to be used for hashing, a partitioned hash function disclosed in "PRINCIPLES OF DATABASE AND KNOWLEDGE-BASE SYSTEMS," J. D. Ullman, Computer Science Press, pp. 358–360 is used to enable record reading with a hash value specified for each broken column.

However, if no broken column is specified, all records are stored in one bucket. For each bucket, a block 113, which is a continuous area in the record storage device, is allocated as required, the records being stored in the allocated blocks. Therefore, in reading the records having the same hash value, no random access to the record storage device takes place.

In record reading from the record storage device 12 in the present preferred embodiment, the following four methods are used according to the content of the database processing immediately after the record read processing.

Method 1: if the immediately following database processing is other than the random sampling processing or if the random sampling column of the immediately following random sampling processing is NULL, normal read processing is performed. Namely, the records included in all buckets are all read.

Method 2: if the random sampling column of the immediately following random sampling processing is not specified, the random sampling processing on a record basis is performed. Namely, one of the records stored in the record storage device 12 is randomly determined for one read request to perform record reading.

Figure 10:
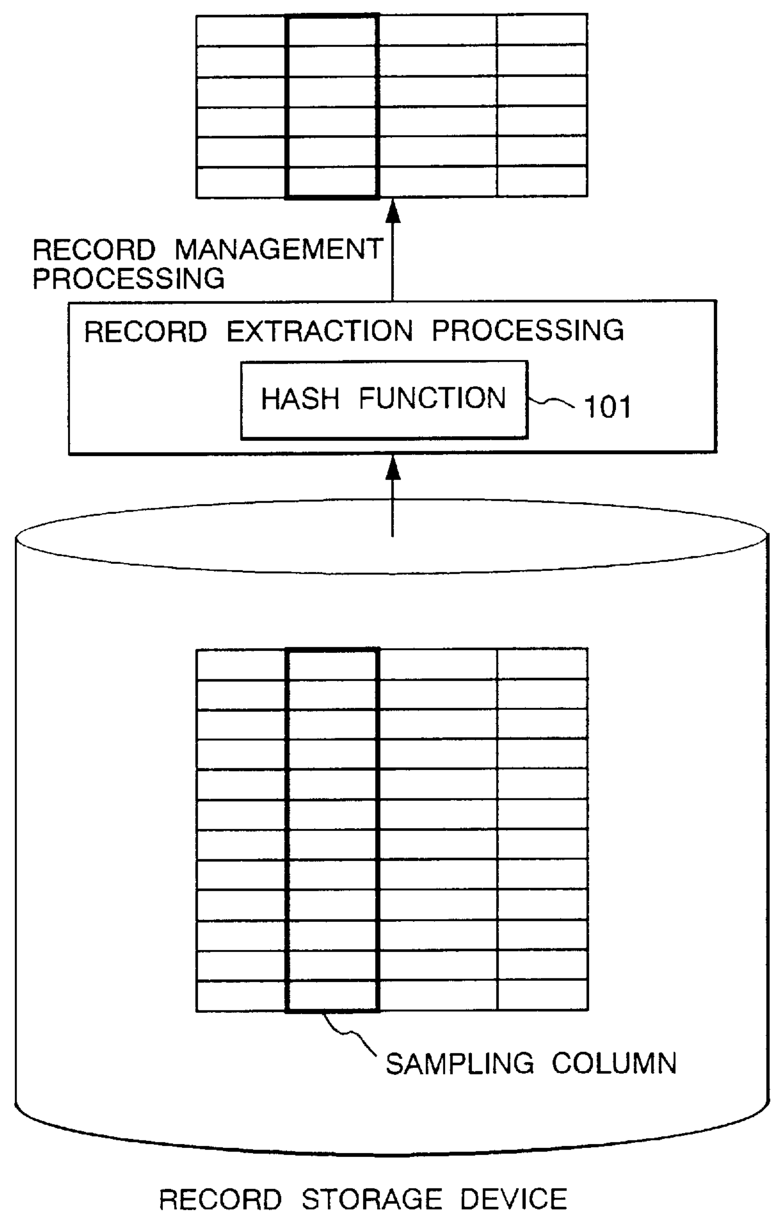
FIG. 10 is a diagram illustrating record read processing for reading records from a record storage device.

Method 3: if no common portion exists between the random sampling column SC of the immediately following random sampling processing and the broken column BC of record, the record read processing with a hash function applied is performed. Namely, as shown in FIG. 10, the hash value is randomly specified for each of the random sampling columns at the time of record reading and the hash function 101 is applied to the random sampling columns SC of the records stored in the record storage device, thereby sampling only the records having the specified hash value. If no broken column is specified, this record reading method is used.

Method 4: if there is a common portion between the random sampling column of the immediately following random sampling processing and the broken column of record, the record read operation using bucket division is performed. Namely, as shown in FIG. 11, a hash value is randomly specified for each of the random sampling columns at the time of record reading. For the common portion SC ∩ BC between the random sampling column SC of the records stored in the record storage device 12 and the stored broken column BC, the records stored in the block 113 of the bucket 112 having the specified hash value are read. Further, a hash function 114 is applied to the difference SC–BC between the random sampling columns SC of the read records and the stored broken columns to sample only the records having the specified hash value.

The record storage device 12 according to the present preferred embodiment stores the records arranged in the form of a table. When storing records in units of buckets, the records allocated to each bucket by the hash value of the broken column of record are allocated to each of the blocks, which are continues areas on the record storage device, thereby enhancing the bucket reading efficiency.

In the query result evaluation processing 10 in the present preferred embodiment, the query result obtained by the above-mentioned query execution processing 9 is evaluated based on the query evaluation criterion generated by the above-mentioned execution procedure generation processing 7 to perform execution management of the query processing.

If a time is specified in the query evaluation criterion generated by the execution procedure generation processing 7, the query processing evaluation processing compares the specified time with the query execution time every time a query result comes from the query execution processing. If the query execution time is found in excess of the specified time, the query processing evaluation processing instructs the query execution processing to stop the query processing.

If a precision is specified in the query evaluation criterion generated by the execution procedure generation processing 7, the query processing evaluation processing calculates the precision of the estimated value of a query result every time the query result comes from the query execution processing. If the precision of the estimated value is found in excess of the specified precision, the query processing evaluation processing instructs the query execution processing to stop the query processing and returns the estimated value and its precision at that time.

The precision of the estimated value can be calculated by the estimation method associated with random sampling method and cluster sampling method disclosed in "Dictionary of Statistics," Hiraku Takeuchi, Toyo Keizai Shinpousha Publishing, pp. 243–247, 252–254.

In the above-mentioned preferred embodiment, the database processing system can also be constituted by use of the query processing method provided with only the query issue processing or the query conversion processing.

In the query conversion processing according to the present invention, query conversion considering the sampling unit of the random sampling processing may be performed in the exchange of application sequences between the random sampling processing and another query processing to apply the present invention to any query including the aggregation processing, thereby enhancing the efficiency of queries of wider range than that of the conventional query conversion processing not considering the sampling unit.

By specifying a time required for query processing and a precision of the estimated value of a query result at the time of issuing a query to adjust the quantity of records to be randomly sampled according to database scale and query complexity, a query result having any given response time and precision can be obtained easily.

Moreover, when performing random sampling on a bucket basis from a table, if the number of records per bucket to be aggregated is large enough, the calculation of the precision of the aggregation result can be approximated by a precision calculating equation used for simple random sampling processing without requiring a new statistical quantity involved in the record division.

While the preferred embodiments of the present invention have been described using specific terms, such description is for illustrative purposes only, and it is to be understood that changes and variations may be made without departing from the spirit or scope of the appended claims.

What is claimed is:

1. A data random sampling processing method for use in a database processing system for sampling desired data from a database, comprising:

(1) query issuance management processing for issuing a query to said database;

(2) query execution control processing for controlling execution of the issued query; and (3) data management processing for storing data into said database and managing the stored data, wherein said query execution control processing of (2) has:

(2-1) processing for inserting random sampling processing into said query issued by said query issue processing; and (2-2) processing for converting said query into a query to perform relatively highly efficient data sampling storing while preserving a sampling unit of the inserted random sampling processing.

2. A data random sampling processing method as claimed in claim 1 having query conversion processing for exchanging processing application sequences such that, if, in the random sampling processing of claim 1, content of the query processing to be executed in said query execution control processing of (2) includes processing that:

(A) classification and aggregation processing is performed on a table of records to be processed as data such that the records in the table are divided into groups according to values of one or more grouping columns specified in the query issued in said query issuance management processing of (1) and values of one or more aggregation columns specified in the same way are aggregated for each of said groups and then (B) a value is randomly specified for each of one or more random sampling columns specified in the query and the random sampling processing is applied to sample all records having the specified value from a result of the aggregation, then said query conversion processing exchanges processing application sequences such that said query conversion processing of (2-2) applies the processing of (A) to the records in the table after applying the processing of B to the same.

3. A data random sampling processing method as claimed in claim 2 having query conversion processing, wherein, if, in said random sampling processing of claim 2, the random sampling processing of (B) is random sampling processing on a record basis specifying no random sampling column, said query conversion processing converts the query into a query that uses the grouped columns of the grouping and aggregation processing of (A) as the random sampling columns of said random sampling processing and then performs the conversion of the query of claim 2.

4. A data random sampling processing method as claimed in claim 1 having query conversion processing, wherein, if, in said random sampling processing of claim 1, content of the query processing to be executed in said query execution control processing of (2) includes processing that:

(A) with respect to a table for records as data to be processed, records in a table are divided into groups according to values of one or more grouping columns specified in the query issued by the query issuance management processing of (1);

(B) values of one or more random sampling columns specified in the query issued by the query issuance managmenet processing of (1) are randomly specified for each of the groups and the random sampling processing is applied to sample all records having the specified value from a result of the grouping processing; and then (C) the aggregation processing associated with values of one or more aggregation columns specified in the query is applied to a result of the random sampling of each group, then the query conversion processing of (2-2) changes said processing content such that:

(A) first the grouping columns specified in the query are specified as sample grouping columns for the table to be processed and the records in the table are dividing into groups according to values of the sample grouped columns;

(B) a value is randomly specified for each of random sampling columns for each of the groups and the random sampling processing for sampling all records having the specified value is applied; and then (C) the grouping and aggregation processing of the query before conversion is applied to a result of said random sampling processing.

5. A data random sampling processing method as claimed in claim 1 having query conversion processing, wherein, if, in the random sampling processing of claim 1, the content of the query processing to be executed in the query execution control processing of (2) includes processing that:

(A) for two tables to be processed, join processing is applied to join records having a value equal to one or more join columns specified in the query issued in (1) in both tables into one record; and (B) a value is randomly specified for each of one or more random sampling columns specified in said query and the random sampling processing is applied to sample all records having the specified value from a result of said join processing, then said query conversion processing of (2-2) changes said processing content such that:

(A) first the random sampling processing in which the random sampling columns are limited to columns commonly included in respective tables is applied to each of the tables to be processed; and then (B) the join processing associated with the join columns specified in the query before conversion to a result of sampling from each of the tables.

6. A data random sampling processing method as claimed in claim 1 having query conversion processing, wherein, if, in said random sampling processing of claim 1, the content of the query processing to be executed in said query execution control processing of (2) includes processing for applying grouping and aggregation processing that:

(A) to a table to be processed, random sampling processing is applied such that records in the table are divided into groups according to values of one or more sample grouping columns specified in the query issued in (1), a value is randomly specified for each of random sampling columns specified in said query for each of the groups, and all records having the specified value are sampled; and then (B) the records in the table are divided into groups according to values of one or more grouping columns specified in the query and the grouping and aggregation processing for aggregating values of one or more aggregation columns specified for each of the groups is applied, then said query conversion processing of (2-2) changes said processing content such that random sampling processing using a difference obtained by subtracting the sample grouping columns from the random sampling columns as a new random sampling column is applied to the table to be processed and then the processing of (B) is applied to the same.

7. A data random sampling method as claimed in claim 1 having query conversion processing, wherein, if, in the random sampling processing of claim 1, content of query processing to be executed in said query execution control processing of (2) includes processing for (A) applying, to a table to be processed, condition evaluation processing for records in the table according to values of one or more condition evaluation columns specified in the query issued in (1), and (B) randomly specifying value for each of one or more random sampling columns specified in the query and applying random sampling processing for sampling all records having the specified value from a result of said condition evaluation processing, then said query conversion processing changes said processing content such that:

(A) to the table to be processed, random sampling processing using one or more random sampling columns specified in the query is applied; and then (B) to a result of the sampling, condition evaluation processing using one or more condition evaluation columns specified in the query is applied.

8. A data random sampling method as claimed in claimed 1 having query conversion processing, wherein, if, in the random sampling processing of claim 1, content of query processing to be executed in said query execution control processing of (2) includes processing for (A) applying, to a table to be processed, projection processing for extracting one or more projection columns of records specified in the query issued in (1) and (B) randomly specifying value for each of one or more random sampling columns specified in the query and applying random sampling processing for sampling all records having the specified value from a result of said projection processing, then said query conversion processing of (2-2) changes said processing content such that:

(A) to the table to be processed, random sampling processing using random sampling columns specified in the query and then (B) to a result of the sampling, projection processing using projection columns specified in the query is applied.

9. A data random sampling processing method for use in a database processing system for sampling desired data from a database, comprising:

(1) query issuance management processing for issuing a query to said database;

(2) query execution control processing for controlling execution of the issued query; and (3) data management processing for storing data into said database and managing the stored data, wherein said query issuance management processing has (1-1) query issue processing for generating a query statement according to an input from a terminal device; and (1-2) query result display processing for displaying a query result and an evaluation result onto said terminal device, said query execution control processing of (2) has (2-1) execution method generation processing for generating a query execution procedure inserted with random sampling processing from the query statement issued from said query issue processing of (1-1) and a query result evaluation criterion for evaluating a query result by random sampling;

(2-2) query conversion processing for converting the query execution procedure generated from said execution method generation processing of (2-1) into a query execution processing for performing relatively highly efficient data sampling while preserving a sampling unit of the inserted random sampling processing;

(2-3) query execution processing for executing the query according to the query execution procedure converted by the query conversion processing of (2-2) and issuing a data read request to said data control processing of (3); and (2-4) query result evaluation processing for evaluating a result of said query execution processing of (2-3) according to the criterion generated by said execution method generation processing of (2-1), passing a query result and an evaluation result to said query issue processing of (1), and controlling said query execution processing of (2-3) according to said query result and said evaluation result, and said data management processing of (3) has (3-1) data storage processing for storing data into an external data storage device; and (3-2) data read processing for reading data according to a data read request issued by said query execution processing of (2-3).

10. A data random sampling processing method for use in a database processing system for sampling desired data from a database, comprising:

(1) query issuance management processing for issuing a query to said database;

(2) query execution control processing for controlling execution of the issued query; and (3) data management processing for storing data into said database and managing the stored data, wherein, if said data management processing of (3) includes random sampling processing for randomly specifying a value for each of one or more random sampling columns specified in the query issued by said query issue processing of (1) with respect to query execution processing to be executed in said query execution control processing of (2) and sampling all records having the specified value from a result of said query exection processing, said data management processing, when sampling records from a table listing records as data, applies a hash function to a random sampling column and provides a result of sampling all records having a randomly determined hash value as a random sampling result.

11. A data random sampling processing method as claimed in claim 10, wherein, in the random sampling processing of claim 10, said data management processing of (3) divides the records in the table into buckets containing mutually exclusive records according to the hash value of the random sampling columns specified in the query, allocates the buckets to one or more blocks which are continuous areas on an external record storage device for being stored, and makes all records in the bucket one random sampling unit, thereby executing reading of the records included in the buckets by sequential access to the record storage device.

12. A data random sampling processing method for use in a database processing system for sampling desired data from a database, comprising:

(1) query issuance management processing for issuing a query to said database;

(2) query execution control processing for controlling execution of the issued query; and (3) data management processing for storing data into said database and managing the stored data, wherein said query issuance management processing of (1) issues a query statement for specifying introduction of random sampling processing into an appropriate point of query processing.

13. A data random sampling processing method as claimed in claim 12, wherein in the random sampling processing of claim 12, said query issuance management processing of (1) specifies a time required for the query processing in addition to the specification for the introduction of random sampling processing into the query processing and said query execution control processing of (2) adjusts an amount of data to be randomly sampled according to the specified query execution time, thereby ensuring to end the query processing within the time specified at query issuance.

14. A data random sampling processing method as claimed in claim 12, wherein said query issuance management processing of (1) specifies a precision of an estimated value of a aggregation processing result in addition to the query issue processing for specifying introduction of the random sampling processing and said query execution control processing of (2) adjusts the number of records to be randomly sampled according to the specified precision of the estimated value, thereby returning an aggregation processing estimated value having the precision specified at query issuance.

15. A database processing system for sampling desired data from a database according to input information from a terminal device, comprising:

(1) query issuance management means for issuing a query to said database;

(2) query execution control means for controlling execution of the issued query; and (3) data management means for storing data into said database and managing the stored data, wherein said query issuance management means has (1-1) query issue means for generating a query statement according to an input from said terminal device; and (1-2) query result display means for displaying a query result and an evaluation result onto said terminal device, said query execution control means of (2) has (2-1) execution method generation means for generating a query execution procedure inserted with random sampling processing from the query statement issued from said query issue means of (1-1) and a query result evaluation criterion for evaluating a query result by random sampling;

(2-2) query conversion means for converting the query execution procedure generated from said execution method generation means of (2-1) into a query execution procedure for performing relatively highly efficient data sampling while preserving a sampling unit of the inserted random sampling processing;

(2-3) query execution means for executing the query according to the query execution procedure converted by the query conversion means of (2-2) and issuing a data read request to said data management means of (3); and (2-4) query result evaluation means for evaluating a result of said query execution of (2-3) according to the criterion generated by said execution method generation means of (2-1), passing a query result and an evaluation result to said query issue means of (1), and controlling said query execution means of (2-3) according to said query result and said evaluation result, and said data management means of (3) has (3-1) data storage means for storing data into said database; and (3-2) data read means for reading data from said database according to a data read request issued by said query execution means of (2-3).

16. A recording medium for recording a program for executing the data random sampling processing method of claim 9.

* * * * *